Figure 1:
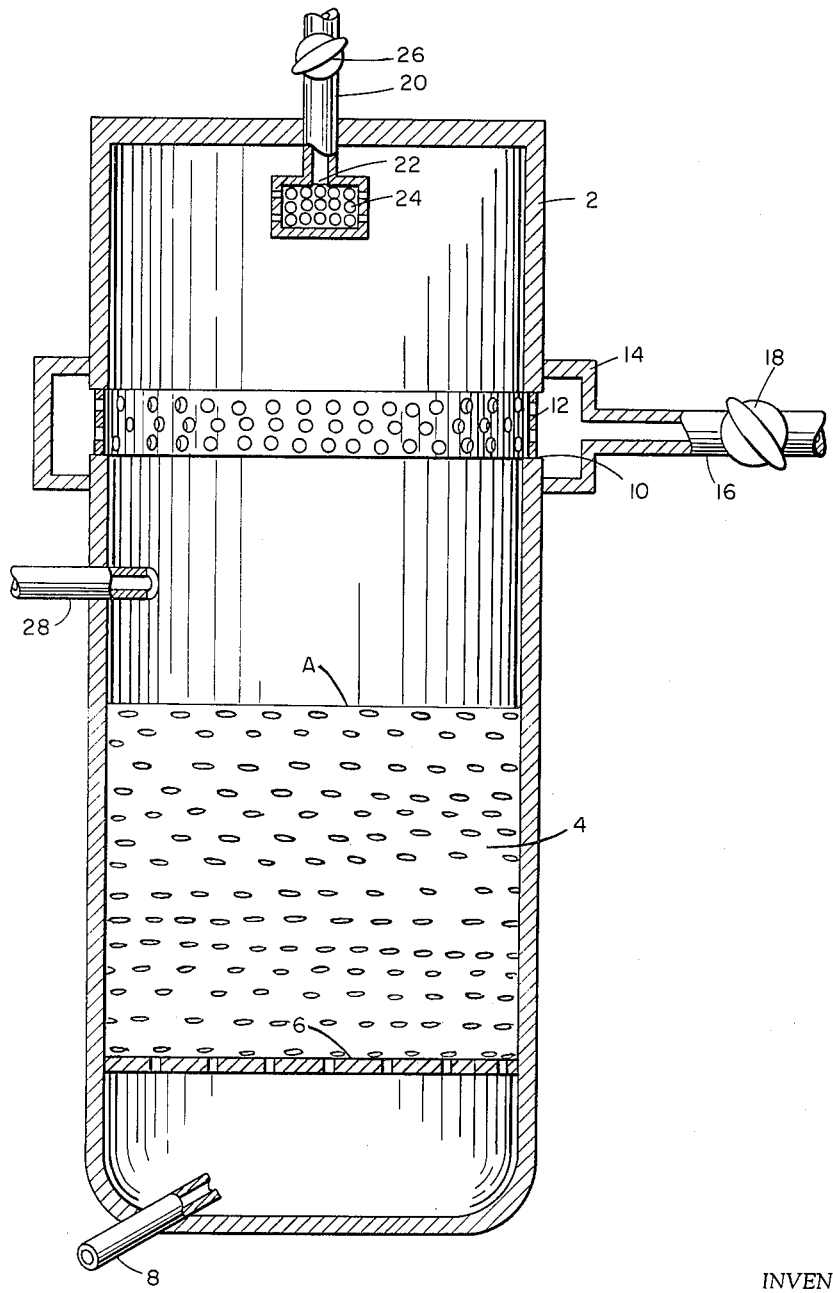

May 24, 1966  L. P. HATCH ETAL  3,252,271
PARTICLE FILTER
Filed April 3, 1964

INVENTORS
LORANUS P. HATCH
JAMES J. REILLY
STEPHEN J. WACHTEL
BY

United States Patent Office 3,252,271
Patented May 24, 1966

3,252,271
PARTICLE FILTER
Loranus P. Hatch, Brookhaven, James J. Reilly, Bellport, and Stephen J. Wachtel, Rocky Point, N.Y., assignors to the United States of America as represented by the United States Atomic Energy Commission
Filed Apr. 3, 1964, Ser. No. 357,339
2 Claims. (Cl. 55—99)

This invention is related to a novel continuously operable fluidized bed reactor apparatus and process. More particularly it is related to an apparatus and process in which particulate solids are fluidized in a vessel by a gaseous medium wherein means are provided for preventing fines produced in the system from interfering with the operation of the system.

The use of fluidized beds in the chemical and petroleum industries is well known to those skilled in the art.

The fluidized bed as it is called, results when a fluid, usually a gas, flows upward through a bed of suitably sized particulate solids at a velocity sufficiently high to buoy the particles, to overcome the influence of gravity, and to impart to them an appearance of great turbulence, similar to that of a violently boiling liquid. Fluid velocities must be intermeidate between that which would lift the particles to maintain a uniform suspension and that which would sweep the particles out of the container in which fluidization is taking place.

During fluidization of the bed there is excellent contact between the solid particles and the gaseous fluidizing medium, and if there is a temperature difference there is an excellent flow of heat between the particles and the gas. Similarly there is a major opportunity for mass transfer to or from the solid particles and between the solid particles and the gas phase, as in the movement of reactants in the fluid phase toward the surface of solid particulate catalysts and the reverse movements of the products away from the catalytic surface back to the body of the fluid phase.

Thus with such excellent opportunities for heat and mass transfer to or from solids and fluids, fluidized beds have become a major tool in such fields as drying, roasting, other processes involving chemical decomposition by heat. An important application has been in the catalysis of gas reactions wherein the excellent opportunity of heat transfer and mass transfer between the catalytic surface and the gas stream gives performance unequaled by any other system. Many other chemical processes have utilized the fluid bed system, e.g. the catalytic conversion of naphthalene to phthallic anhydride.

A limiting factor on the efficiency of certain conventional fluidized bed operations has been the high degree of attrition of the solids of the bed occurring because of the turbulence of the solids making up the solids portion of the bed. As the particulate solids are fragmented and/or worndown by the intercollisions with each other they lose weight and are subject to being carried out of the bed as very small fragments commonly referred to as fines. Many conventional systems provide costly recovery systems to recover such attrition produced fines. Further many catalysts are so pulvirulent that the turbulence found in conventional fluid beds prevents their use in fluidized bed processes. To prevent fines produced in the bed from intermixing with the reaction products being drawn out of the system, fluidized bed operators have resorted to the use of porous filters placed well above the fluidized bed to trap any fines which are picked up and carried along with the reaction product. Such filters are generally inefficient due to their tendency to become clogged with the fines and the requirement that they be cleaned and replaced at regular intervals. The usual filter cleaning methods are to close down the system to blowback the gas through and/or to heat the filter to remove fines from the filter. When a blowback system is employed to clean the filter, fluidization of the bed must of necessity be halted or an alternative gas removal system must be employed while the cleaning operation is carried out, thus raising the costs of production. Many solids utilized in conventional fluid bed systems would be deleteriously affected by the application of temperatures higher than those normally utilized in the system.

More recently fluidized bed systems have been shown to be of great utility in the recovery of unspent nuclear fuel from spent nuclear fuel elements. Co-pending application S.N. 325,190, L. P. Hatch et al. filed November 20, 1963, discloses the use of a fluidized bed system to recover fertile nuclear fuel from spent carbon clad uranium bearing nuclear fuel elements. The process disclosed therein makes use of a conventional fluidized bed reaction having a bed composed of aluminum oxide particles and utilizing gaseous oxygen to effectuate decladding the elements. A major problem exists when conventional fluidized bed techniques are adapted to this system. During the decladding operation small fines of graphite are produced which tend to become entrained in the pores of the filter which is utilized in the system to prevent such fines from becoming intermixed in the reaction product. The fines entrained in the filter are then rapidly oxidized during processing while in the filter and causing large holes to be burned in the filter. The large holes so burned in the filter permit fines to pass through with and contaminate the reaction product.

It is an object of this invention to provide those skilled in the art with a process and apparatus wherein fluidized bed processes can be carried out continuously and without contamination of the reaction products by fines produced by the process.

It is a further object of this invention to provide those skilled in the art with an efficient process and aparatus for increasing the efficiency of fluidized bed processes and reactors.

Other objects of this invention will in part be obvious and will in part appear hereinafter.

It has been discovered that the above and other objects of this invention can readily be accomplished by a method of operating a fluidized bed reactor, the reactor having a reactor vessel containing a bed of fluidizable particulate solids having a predetermined minimum particle size, gas inlet means to the vessel, gas outlet means from the vessel having a porous membrane covered orifice disposed within said vessel having a maximum pore size which is smaller than the minimum predetermined size of the particulate solids, comprising the steps of flowing into the vessel through the gas inlet means and bed of particulate solids at a rate sufficient to cause fluidization of the solids and removing the gas out of the vessel by passing it through the porous covered orifice of the gas outlet means, adjusting the position of the membrane covered orifice of the gas outlet means so as to contact it with the fluidized solids so as to cause a static bed of at least a portion of the fluidized solids to adhere to the membrane covering the orifice.

By the term static bed as employed in this application is meant a bed composed of particulate solids, the individual particles of such a bed being held in repose by the passage of gas through the bed at such a high rate as to hold the particles firmly against the force of gravity in contact with the porous membrane covering the orifice of the gas outlet means. In such a bed the motion of the individual particles making up the bed is vastly restricted due to the force applied to the bed by the flow of gas therethrough. Thus an easily removable additional filter is provided to the system by the static bed. In practice after a static bed covers the membrane covered orifice of the gas outlet means, the static bed acts as an extra filter which prevents fines from entering the pores of the membrane and escaping from the system with the outlet gas. The static bed filter thus formed can be enlarged or diminished simply by adjusting the superficial velocity of fluidizing medium through the system. Further the static bed can be dropped from the membrane and regenerated thereon without interrupting fluidization by regulating the rate superficial velocity of the gaseous fluidizing medium through the system.

By the term adjusting the location of the porous membrane covered orifice in our invention we mean that either means can be provided whereby the actual physical location of the orifice can be changed, or that the relationship or distance between the fluidized bed and the orifice can be adjusted by increasing or decreasing the degree of fluidization of the bed solids by adjusting the superficial velocity of the fluidizing medium. It must be borne in mind that initially to form the static bed on the membrane covering the orifice of the gas outlet means upon which the static bed is to be formed that the membrane must be contacted with the fluidized bed. Of course when a reactor vessel is to be constructed for continuous operation the orifices of the gas outlet means can be fixedly located in accordance with the principles of our invention at the point which would be most favorable to the formation of the desired static bed.

In the preferred embodiment of our invention we utilize a fluidized bed reactor apparatus having at least two separate porous membrane covered gas outlets one of which has a porous membrane covered orifice which runs circumferentially around the side walls of the reactor vessel located at a position which is intermediate between the orifice of the other gas outlet means and the gas inlet means. In the operation of the preferred embodiment of our invention gas is introduced into the reactor vessel while the intermediately located gas outlet means is shut off and the fluidizing medium is removed from the vessel through the upper gas outlet means. The bed is fluidized and allowed to expand until the topmost portion of the bed is located at a position between the two gas outlet means, thereafter the gas is removed from the vessel through the intermediately located gas outlet means while the upper gas outlet means is simultaneously shut off. A disc shaped static bed is thus formed in the vessel with its outer rim being in contact with the circumferentially shaped orifice. The disk shaped static bed thus formed provides an excellent filter for the system while permitting fluidization of the remainder of the bed to continue in the vessel a slight distance below the disk. The filtering action of such disk shaped static beds can easily be regenerated without interrupting fluidization merely by lowering the pressure drop of the system to permit the bottom layer of the disk to drop down into the fluidized portion of the system and thereafter raising the pressure drop of the system to cause portions of the fluidized bed portion of the system to replace the portion of the disk previously employed.

The porous membrane found usable in our invention can be made of any porous material i.e. nickel, which has the desired pore size and which is chemically and physically compatible with the materials and conditions which are to be employed in the system.

Conventional means for removing fines i.e. syphon means can readily be employed in removing fines from the reactor vessel and in many cases will be sufficient when coupled with our invention to permit continuous operation of fluidized bed reactor operations which were previously plagued by shutdowns due to the production of fines therein. Such syphoning means can be advantageously employed in our invention to selectively remove portions of the fluidized bed rich in fines from the vessel.

The use of multiple gas outlet means one of which has a porous membrane covered orifice which is located at an intermediate position between the other gas outlet means and the gas inlet means facilitates the formation of a more uniform static bed and facilitates the regeneration of the static beds on the porous membrane covered orifice which is in such an intermediate position. This is true whether or not the intermediate orifice runs circumferentially around the walls of the vessel or not.

In order that our invention may be more fully understood, reference is made to FIG. 1 hereof which shows a cut away side view of our novel apparatus.

FIG. 1 shows a cylindrically shaped reactor vessel 2 having a bed of particulate solids 4, the top of the bed 4 being shown by phantom line A resting on a porous grate 6. A tubular gas inlet means 8 is provided for the introduction of a fluidizing gaseous medium into the vessel 2. A first gas outlet means comprising an orifice 10 running circumferentially around the walls of the vessel 2 is covered by a porous membrane 12, having a manifold 14 connected to at least one tubular means 16 having a valve 18 connected to the vessel to permit gas to be removed from the vessel. A second gas outlet means connected to vessel 2 is also provided and it comprises a tubular member 20 having an orifice 22 covered by a cylindrically shaped porous membrane 24 and having a valve 26 is also provided to permit removal of fluidizing gas from the vessel. A tubular system means 28 is also provided to enable particles rich in fines to be removed from the bed and is located at a point well above the top of the bed shown by phantom line A.

The bed is operated by opening valve 26 and closing valve 18, thereafter introducing a gaseous fluidizing medium into the vessel 2 through the gas inlet means 8. The gas thus introduced into the vessel 2 will disperse up through the grate 6 causing the bed 4 to become fluidized and expanded. When the bed 4 has expanded such that the top of the bed is located at a point intermediate between orifices 10 and 22, valve 26 is closed while valve 18 is simultaneously opened causing a disc shaped static bed of particulate solids to form across the vessel 2 completely covering orifice 10. An expanded bed of particulate solids is also formed the top of which is located at an intermediate point between the static bed and the bottom of the vessel. The syphon means 28 will permit removal of portions of the fluidized bed thus formed which are rich in fines.

Our process has been successfully operated in fluidized bed systems in which there has been only one gaseous outlet means e.g. porous membrane covered orifice located at the top of the reactor vessel. However, in the preferred embodiment of our invention we employ a vessel having two separate gas outlet means, one of which is comprised of a porous membrane covered orifice running circumferentially around the sides of the reactor vessel and located at a point intermediate between the upper gas outlet means and the gas inlet means because with this arrangement a vastly superior filtering action by the static bed is achieved.

Of course it must be understood that our invention is readily adaptable to any conventional fluidized bed process or apparatus.

The following example is given merely to illustrate the principles and practice of our invention and is in no way to be construed as limiting the scope of our invention.

A fluidized reactor vessel essentially similar to that shown in FIG. 1 of this application was constructed of tubular transparent Lucite plastic. The vessel was about 40 inches in length having an inside diameter of about 3 inches. The first gas outlet means was located about 20 inches above the bottom of the vessel and consisted of a porous membrane composed of nickel having a pore size of about 20$\mu$ and a thickness of about 1/16 inch, the membrane completely covered an orifice approximately 1 inch in vertical length which ran circumferentially around the vessel. A second gas outlet means consisting of a piece of tubing flanged to and connected with top of the reactor vessel was provided. The second gas outlet means had an orifice located inside the top of the reactor, which orifice had a cylindrically shaped porous nickel filter depending from the flanged tubing into the vessel for about 10 inches. This filter has a pore size of about 20μ and a diameter of one inch. The reactor vessel was loaded to a depth of about 15 inches with $Al_2O_3$ particles having an average particle size of about 60 mesh. A tank of gaseous nitrogen was connected to the bottom of the vessel to provide a gaseous fluidizing medium. About 20 grams of ordinary talcum powder was added to the $Al_2O_3$ particles to provide fines to the seystem.

The first gas outlet means was shut off and the second gas outlet means was opened up, thereafter nitrogen was passed through the bed causing the bed to become expanded in such a manner that the $Al_2O_3$ particles formed a fluidized bed, the top of the expanded $Al_2O_3$ bed was located at a point slightly above the first gas outlet means. It was noted that under these conditions that the talc was being entrained in the gas stream and elutriated out of the fluidized bed and depositing on the surface of the filter covering the second gas outlet means. After about one minute of operation the pressure drop across the filter began to rise sharply indicating severe plugging of the filter. The flow of gas through the system was stopped and the plugged filter was cleaned.

The bed material was replaced with approximately the same amount and type of $Al_2O_3$ particles and was fluidized as above. After fluidization was achived in this manner, the second gas outlet means was closed while simultaneously the first gas outlet means was opened. It was noted that the bed remained fluidized with the formation of a static bed of $Al_2O_3$ particles formed immediately across the entire diameter of the vessel. The top of this static bed was located approximately ½ inch above the top of the porous membrane covering the orifice of the first gas outlet means and the bottom of the static bed was located approximately 1½ inches below the bottom of the porous membrane. The remainder of the $Al_2O_3$ particles formed an expanded fluidized bed. The top of the expanded fluidized bed was located about 3 inches below the lower surface of the static bed. Approximately 20 grams of talc was then introduced into the system by entraining it into the fluidizing gas. The system remained in operatin about ½ hour before any noticeable increase in pressure drop through the static bed and filter was noted. At this point the superficial velocity of fluidizing gas was lowered and a layer of static bed material about ½ inch in thickness dropped down into the fluidized bed portion of the system. The pressure drop through the static bed and filter immediately was returned its initial value, the superficial velocity of the gas was then returned to its previous valve and a new layer of relatively clean $Al_2O_3$ material (containing little talc) replaced the layer which had previously fallen from the static bed. This operation was repeated several times and it was noted that the time interval between buildups of pressure drop through the bed and filter shortened with each cycle of the regeneration.

It should be noted that talc was added to the system in the above example solely to add fines to the system and in that system no provision was made for the removal of these fines from the system such as oxidizing with heat and/or selectively syphoning them off. Further the amount of fines added was a large quantity, added solely to illustrate the practice of the invention and should not be construed as a limitation upon the practicality of the invention. In practice a working system would not generally produce such a large proportion of fines.

Obviously our invention provides those skilled in the art with an excellent method for controlling the amount of fines in fluidized bed systems and for preventing such fines from passing out of the system with effluent gases. As a result of our invention a vast increase in efficiency can be obtained in fluidized bed processes such as that disclosed in U.S. patent application S.N. 325,190. Our invention eliminates the requirement of disengaging spaces or high freeboard reactors to reduce particle load on the filter.

Having described our invention what we claim as new and desire to secure by Letters Patent is:

1. A fluidizing apparatus comprising:
   (a) a reactor vessel;
   (b) fluidizable particulate solids having a predetermined minimum size contained in the vessel;
   (c) gas inlet means to the vessel;
   (d) a first gas outlet means from the vessel having an orifice within the vessel;
   (e) valve means of the first gas outlet means;
   (f) a second gas outlet means from the vessel having a porous membrane covered orifice running circumferentialy around the walls of the vessel and located at an intermediate point on the vessel between orifice of the first gas outlet means and the gas inlet means the membrane covering having a pore size which is smaller than the predetermined minimum pore size of said solids;
   (g) valve means on the second gas outlet means;
   (h) pumping means for flowing a gas through said gas inlet means in amounts sufficient to cause fluidization of the solids within the bed.

2. A method of operating a fluidized bed reactor, said reactor having a reactor vessel, a bed of particulate solids having a predetermined minimum particle size contained in the vessel, a gas inlet means having an orifice in the vessel, first and second gas outlet means having orifices within the vessel, the orifice of the second gas outlet means being located at an intermediate position in the vessel between the orifice of the first gas outlet means and the gas inlet means, a porous membrane covering the orifice of said gas outlet means having a pore size which is smaller than the minimum particle size of the solids; comprising; the step of passing a gas through said gas inlet means and said solids while removing all of said passed gas from said vessel out through said first gas outlet means at a rate sufficient to cause fluidization of said solids while simultaneously preventing said passed gas from passing through the second gas outlet means; adjusting the position of the membrane covered orifice of the second gas outlet means so as to contact it with the fluidized solids; thereafter causing said passed gas to be removed from said vessel through said second gas outlet means while simultaneously preventing said gas from passing through said first gas outlet means so as to cause a static bed of at least a portion of the fluidized solids to adhere to said membrane.

References Cited by the Examiner

UNITED STATES PATENTS

| | | | |
|---|---|---|---|
| 2,448,135 | 8/1948 | Becker et al. | 55—99 X |
| 2,689,973 | 9/1954 | Lee et al. | 55—474 |
| 2,805,144 | 9/1957 | Stotler | 55—474 |
| 2,960,388 | 11/1960 | Johnson et al. | 55—474 |
| 2,961,304 | 11/1960 | Collins | 23—288 |

REUBEN FRIEDMAN, *Primary Examiner.*

J. ADEE, *Assistant Examiner.*